US011984069B2

(12) United States Patent
Han

(10) Patent No.: US 11,984,069 B2
(45) Date of Patent: *May 14, 2024

(54) IMAGE STICKING COMPENSATING DEVICE AND DISPLAY DEVICE HAVING THE SAME

(71) Applicant: Samsung Display Co., Ltd., Yongin-Si (KR)

(72) Inventor: Sang-Myeon Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,802

(22) Filed: Oct. 17, 2022

(65) Prior Publication Data

US 2023/0038211 A1 Feb. 9, 2023

Related U.S. Application Data

(63) Continuation of application No. 17/090,308, filed on Nov. 5, 2020, now Pat. No. 11,501,700, which is a (Continued)

(30) Foreign Application Priority Data

Jan. 22, 2016 (KR) ........................ 10-2016-0007913

(51) Int. Cl.
*G09G 3/3208* (2016.01)

(52) U.S. Cl.
CPC ... *G09G 3/3208* (2013.01); *G09G 2320/0257* (2013.01); *G09G 2320/0271* (2013.01);
(Continued)

(58) Field of Classification Search
CPC ......... G09G 3/3208; G09G 2320/0257; G09G 2320/0271; G09G 2320/041;
(Continued)

(56) References Cited

U.S. PATENT DOCUMENTS 8,922,595 B2 12/2014 Ahn et al.
9,047,812 B2 6/2015 Chun et al.
(Continued)

FOREIGN PATENT DOCUMENTS

KR 10-2006-0120766 A 11/2006
KR 10-2012-0094736 A 8/2012
(Continued)

*Primary Examiner* — Matthew A Eason
*Assistant Examiner* — Sujit Shah
(74) *Attorney, Agent, or Firm* — Innovation Counsel LLP

(57) ABSTRACT

A image sticking compensating device according to example embodiments includes a degradation calculator configured to calculate a degradation weight based on input image data, and to calculate degradation data of a frame, an accumulator configured to accumulate the degradation data, and to generate age data using the accumulated degradation data, and a compensator configured to determine a grayscale compensation value corresponding to the age data and an input grayscale of the input image data, and to output age compensation data by applying the grayscale compensation value to the input image data.

18 Claims, 11 Drawing Sheets

Related U.S. Application Data continuation of application No. 16/358,574, filed on Mar. 19, 2019, now Pat. No. 10,839,743, which is a continuation of application No. 15/411,486, filed on Jan. 20, 2017, now Pat. No. 10,262,582.

(52) U.S. Cl.
CPC . *G09G 2320/041* (2013.01); *G09G 2320/046* (2013.01); *G09G 2320/048* (2013.01); *G09G 2320/0666* (2013.01); *G09G 2360/16* (2013.01)

(58) Field of Classification Search
CPC ....... G09G 2320/046; G09G 2320/048; G09G 2320/0666; G09G 2360/16
See application file for complete search history.

(56) References Cited

U.S. PATENT DOCUMENTS

| | | | | |
|---|---|---|---|---|
| 2004/0135799 | A1 | 7/2004 | Shiomi et al. | |
| 2006/0015342 | A1 | 1/2006 | Kurzweil et al. | |
| 2006/0061292 | A1 | 3/2006 | Koh et al. | |
| 2012/0212516 | A1* | 8/2012 | Ahn | G09G 3/3233 345/77 |
| 2014/0232409 | A1* | 8/2014 | Keum | G09G 3/3233 324/414 |
| 2015/0294626 | A1* | 10/2015 | Bi | G09G 3/3233 345/82 |
| 2016/0027382 | A1 | 1/2016 | Chaji et al. | |
| 2016/0104411 | A1 | 4/2016 | Nathan et al. | |
| 2016/0335965 | A1* | 11/2016 | Huang | G09G 3/3208 |

FOREIGN PATENT DOCUMENTS

| | | |
|---|---|---|
| KR | 10-2014-0056799 A | 5/2014 |
| KR | 10-2015-0021370 A | 3/2015 |

* cited by examiner

FIG. 7

LUT

AGE

GRAY

| 8bit | 13bit | 0 | 1 | 2 | 3 | 4 | 5 | ... | 1021 | 1022 | 1023 |
|---|---|---|---|---|---|---|---|---|---|---|---|
| 0 | 0 | 0 | 0 | 0 | 0 | 0 | 0 | ... | 0 | 0 | 0 |
| 1 | 32 | 32 | 34 | 36 | 38 | 40 | 41 | ... | 64 | 64 | 65 |
| 2 | 64 | 64 | 66 | 68 | 70 | 72 | 73 | ... | 94 | 94 | 95 |
| ... | ... | ... | ... | ... | ... | ... | ... | ... | ... | ... | ... |
| ... | ... | ... | ... | ... | ... | ... | ... | ... | ... | ... | ... |
| 253 | 8128 | 8128 | 8172 | 8189 | 8191 | 8191 | 8191 | ... | 8191 | 8191 | 8191 |
| 254 | 8160 | 8160 | 8181 | 8191 | 8191 | 8191 | 8191 | ... | 8191 | 8191 | 8191 |
| 255 | 8191 | 8191 | 8191 | 8191 | 8191 | 8191 | 8191 | ... | 8191 | 8191 | 8191 |
| | | | | | | | | | | | |
| ASR | | 1.000 | 0.995 | 0.992 | 0.988 | 0.984 | 0.982 | ... | 0.723 | 0.715 | 0.709 |

k (columns), j (rows)

| | | | | | |
|---|---|---|---|---|---|
| 1.02 | 1.01 | ... | ... | 1.00 | 1.00 |
| 1.02 | 1.00 | ... | ... | 0.99 | 0.98 |
| ... | ... | ... | ... | ... | ... |
| 1.04 | 1.03 | ... | ... | 0.99 | 0.98 |
| 1.05 | 1.04 | ... | ... | 0.99 | 0.98 |

IMAGE STICKING COMPENSATING DEVICE AND DISPLAY DEVICE HAVING THE SAME

CROSS REFERENCE TO RELATED APPLICATION

This application is a continuation application of U.S. patent application Ser. No. 17/090,308 filed on Nov. 5, 2020, which is a continuation application of U.S. patent application Ser. No. 16/358,574 filed on Mar. 19, 2019 (now U.S. Pat. No. 10,839,743), which is a continuation application of U.S. patent application Ser. No. 15/411,486 filed on Jan. 20, 2017 (now U.S. Pat. No. 10,262,582), which claims priority under 35 USC § 119 to Korean Patent Application No. 10-2016-0007913, filed on Jan. 22, 2016 in the Korean Intellectual Property Office (KIPO), the disclosures of which are incorporated herein in their entirety by reference.

BACKGROUND

1. Field

Example embodiments of the inventive concept relate to display devices. More particularly, example embodiments of the inventive concept relate to image sticking compensating devices and display devices having the same.

2. Discussion of Related Art

A display device (an organic light emitting display device) accumulates age information (e.g., stress information or degradation degree information) using an image sticking compensation technique and eliminates image sticking by compensating the age (or the stress) of every pixel based on the accumulated data. For example, the stress (or the degradation, age) information may be accumulated based on a current flowing into each pixel at each frame, an emission time of each pixel, a temperature of a display panel, and/or the like.

However, the typical stress accumulation methods apply the same compensation values to all the grayscale levels regardless of display grayscale according to the accumulated stress information. Thus, the image sticking may be recognized at some grayscale levels in which improper compensation is performed in an actual display panel.

SUMMARY

Example embodiments provide an image sticking compensating device for determining grayscale compensation values based on age data having accumulated degradation information and input grayscales.

Example embodiments provide a display device including the image sticking compensating device.

According to example embodiments, a display device may comprise a degradation calculator configured to calculate a degradation weight based on input image data, and to calculate degradation data of a frame, an accumulator configured to accumulate the degradation data, and to generate age data using the accumulated degradation data, and a compensator configured to determine a grayscale compensation value corresponding to the age data and an input grayscale of the input image data, and to output age compensation data by applying the grayscale compensation value to the input image data.

In example embodiments, the image sticking compensating device may further comprise a grayscale scaler configured to generate a scaled input grayscale based on a scaling ratio corresponding to the age data to prevent the grayscale compensation value from saturating according to the accumulated degradation data.

In example embodiments, the compensator may comprise a memory including a plurality of lookup tables each having compensation values respectively corresponding to a plurality of predetermined age values and display grayscales implemented by a display panel, each of the age values matching a corresponding one of the age data, a compensation value determiner configured to determine the grayscale compensation value corresponding to the age data and the scaled input grayscale through the lookup tables, and a compensation data output configured to output the age compensation data by applying the grayscale compensation value to the scaled input grayscale data.

In example embodiments, the lookup tables may be set based on pixel colors in the display panel and predetermined temperatures of the display panel, respectively.

In example embodiments, the compensation value determiner may be configured to select one of the lookup tables based on a current temperature of the display panel and a pixel color.

In example embodiments, pixel colors may include a red, a green, and a blue.

In example embodiments, the compensator may be configured to divide the display panel into a plurality of blocks, determine block weight corresponding to each of the blocks, further apply the block weight to the age data, and determine the grayscale compensation value based on the age data to which the block weight is applied.

In example embodiments, the degradation weight may include at least one of a location weight calculated based on a location of a pixel corresponding to the input image data, a luminance weight calculated based on the input grayscale corresponding to the input image data, and a temperature weight calculated based on a current temperature of the display panel.

In example embodiments, the degradation weight may further include an emission duty weight calculated based on an emission duty corresponding to the input image data and an emission frequency weight calculated based on an emission frequency corresponding to the input image data.

In example embodiments, the compensator may comprise a first calculator configured to calculate a target luminance corresponding to the scaled input grayscale using a predetermined reference grayscale-luminance function, a function corrector configured to correct the reference grayscale-luminance function to a target function for corresponding to the age data and a current temperature of a display panel, and a second calculator configured to calculate the grayscale compensation value corresponding to the target luminance by calculating an inverse function of the target function.

In example embodiments, the target function may include a plurality of different auxiliary functions each defined in a plurality of predetermined grayscale sections.

In example embodiments, auxiliary functions may be continuous with each other.

In example embodiments, the degradation weight may include at least one of a location weight calculated based on a location of a pixel corresponding to the input image data, a luminance weight calculated based on the input grayscale corresponding to the input image data, and a temperature weight calculated based on a current temperature of the display panel.

In example embodiments, the degradation weight may further include an emission duty weight calculated based on an emission duty corresponding to the input image data and an emission frequency weight calculated based on an emission frequency corresponding to the input image data.

In example embodiments, the grayscale scaler may be configured to provide the scaled input grayscale to the accumulator, and the accumulator may be configured to generate the age data by accumulating the degradation data and the scaled input grayscale.

In example embodiments, the compensator may be configured to provide the age compensation data to the accumulator, and the accumulator may be configured to generate the age data by accumulating the degradation data and a grayscale of the age compensation data.

In example embodiments, the image sticking compensating device may further comprise a gamma corrector configured to convert the scaled input grayscale into a gamma voltage represented in a voltage domain for transferring to a data driver. The compensator may be configured to convert the age compensation data into a grayscale voltage in the voltage domain based on the gamma voltage and the age data.

According to example embodiments, a display device may comprise a display panel including a plurality of pixels, an image sticking compensator configured to output age compensation data based on age data and input image data, a scan driver configured to provide a scan signal to the display panel, a data driver configured to provide a data signal corresponding to the age compensation data to the display panel, and a timing controller configured to control the scan driver and the data driver. The image sticking compensator may comprise a degradation calculator configured to calculate a degradation weight based on input image data and to calculate degradation data of a frame, an accumulator configured to accumulate the degradation data and to generate age data using the accumulated degradation data, a grayscale scaler configured to generate a scaled input grayscale based on a scaling ratio corresponding to the age data, and a compensator configured to determine a grayscale compensation value corresponding to the age data and an input grayscale of the input image data, and to output age compensation data by applying the grayscale compensation value to the input image data.

In example embodiments, the compensator may comprise a memory including a plurality of lookup tables each having compensation values respectively corresponding to a plurality of predetermined age values and display grayscales implemented by a display panel, each of the age values matching a corresponding one of the age data, a compensation value determiner configured to determine the grayscale compensation value corresponding to the age data and the scaled input grayscale through the lookup tables, and a compensation data output configured to output the age compensation data by applying the grayscale compensation value to the scaled input grayscale data.

In example embodiments, the compensator may comprise a first calculator configured to calculate a target luminance corresponding to the scaled input grayscale using a predetermined reference grayscale-luminance function, a function corrector configured to correct the reference grayscale-luminance function to a target function for corresponding to the age data and a current temperature of a display panel, and a second calculator configured to calculate the grayscale compensation value corresponding to the target luminance by calculating an inverse function of the target function.

Therefore, the image sticking display device and the display device having the same according to example embodiments may accumulate the degradation data (i.e., generate the age data) with respect to the each of the pixels reflecting location characteristics in the display panel, emission information, temperature, etc, such that accurate amount of degradation of each pixel may be calculated. The image sticking display device may include the compensator to calculating the optimized grayscale compensation value based on the age data and the input grayscales such that accuracy of image sticking compensation may be significantly improved. Further, since individual compensation for all grayscale levels may be performed, the image sticking with respect to all the grayscale levels may be not recognized.

In addition, the image sticking compensating device may calculate the grayscale compensation value in both grayscale domain condition and voltage domain condition so as to be applied to various display devices regardless of the types of pixel circuit and the types of panel driving method.

BRIEF DESCRIPTION OF THE DRAWINGS

Example embodiments can be understood in more detail from the following description taken in conjunction with the accompanying drawings, in which:

FIG. 7 is a block diagram illustrating an example of a lookup table included in the memory of FIG. 5.

DETAILED DESCRIPTION OF EMBODIMENTS

Exemplary embodiments will be described more fully hereinafter with reference to the accompanying drawings, in which various embodiments are shown.

Figure 1:
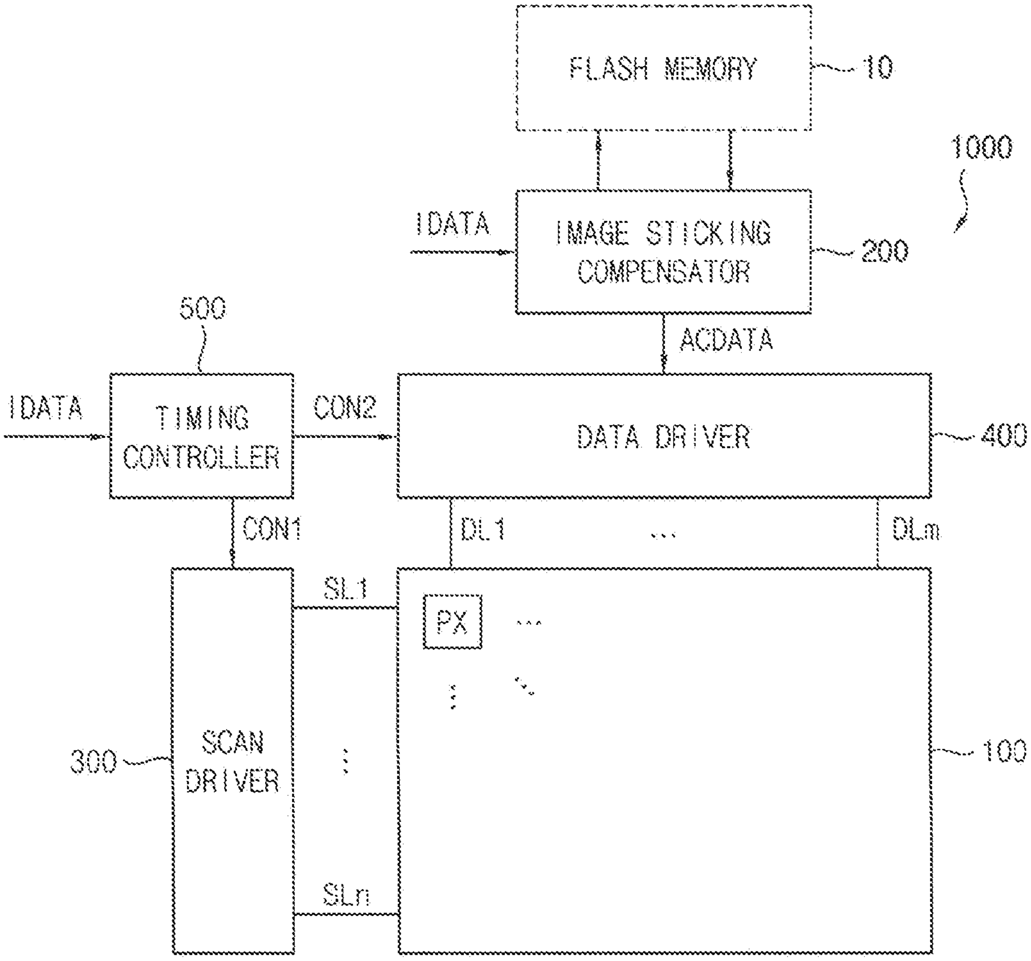
FIG. 1 is a block diagram of a display device according to example embodiments.

FIG. 1 is a block diagram of a display device according to example embodiments.

Referring to FIG. 1, the display device 1000 may include a display panel 100, an image sticking compensator 200, a scan driver 300, a data driver 400, and a timing controller 500.

The display device 1000 may be an organic light emitting display device, a liquid crystal display device, or the like. Further, the display device 1000 may be a flexible display device, a rollable display device, a curved display device, a transparent display device, a mirror display device, or the like, that are implemented by the organic light emitting display device.

The display panel 100 may include a plurality of pixels PX, which display images. That is, the pixels PX may be respectively arranged at locations corresponding to crossing regions of a plurality of scan lines SL1 through SLn and a plurality of data lines DL1 through DLm. In some embodiments, the display panel 100 may provide degradation information (or age information) of the pixels PX generated by pixel sensing to the image sticking compensator 200. The degradation information may include emission time, grayscale level, luminance level, temperature of the pixels PX, and/or the like. The degradation information may be generated by every pixel PX or every pixel block having predetermined grouped pixels. In some embodiments, the pixels PX may mean sub pixels and emit one of a red color light, a green color light and a blue color light.

The image sticking compensator 200 may output age compensation data ACDATA based on age data and input image data IDATA. The image sticking compensator 200 may individually determine a compensation value according to a grayscale to be displayed at a pixel PX. In some embodiments, the image sticking compensator 200 may include a degradation calculator configured to calculate a degradation weight based on the input image data IDATA and to calculate degradation data of a frame, an accumulator configured to accumulate the degradation data and to generate the age data using the accumulated degradation data, a grayscale scaler configured to generate a scaled input grayscale based on a scaling ratio corresponding to the age data, and a compensator configured to determine a grayscale compensation value corresponding to the age data and an input grayscale of the input image data, and to output the age compensation data ACDATA by applying the grayscale compensation value to the input image data IDATA.

In some embodiments, the image sticking compensator 200 may be implemented by a separate application processor (AP). In some embodiments, the image sticking compensator 200 may be included in the timing controller 500. In some embodiments, the image sticking compensator 200 may be included in the data driver 400.

In some embodiments, the accumulated data (e.g., the accumulated degradation data) may be stored in an external flash memory 10.

The compensator may determine the grayscale compensation value using lookup tables or compensated grayscale calculating functions.

In some embodiments, the compensator may include a memory storing a plurality of lookup tables each having compensation values respectively corresponding to a plurality of predetermined age values and display grayscales implemented by the display panel 100, a compensation value determiner configured to determine the grayscale compensation value corresponding to the age data and the scaled input grayscale from the lookup tables, and a compensation data output configured to output the age compensation data ACDATA by applying the grayscale compensation value to the scaled input grayscale data. Each of the age values may match a corresponding one of the age data. In this case, since the grayscale compensation value is determined based on the lookup tables, operation burden may be reduced, and compensation value decision logic may be simplified.

In some embodiments, the compensator may include a first calculator configured to calculate a target luminance corresponding to the scaled input grayscale using a predetermined reference grayscale-luminance function, a function corrector configured to correct the reference grayscale-luminance function to a target function for corresponding to the age data and a current temperature of the display panel 100, and a second calculator configured to calculate the grayscale compensation value corresponding to the target luminance by calculating an inverse function of the target function. In this case, the grayscale compensation value may be calculated through operations using the predetermined functions. Thus, memory for storing the lookup tables is not required such that the memory size may be reduced.

The scan driver 300 may provide scan signals to the display panel 100 via the scan lines SL1 through SLn. The scan driver 300 may provide the scan signals to the display panel 100 based on a first control signal CON1 received from the timing controller 500.

The data driver 400 may provide data signals corresponding to the age compensation data ACDATA to the pixels PX via the data lines DL1 through DLm. The data driver 400 may provide the data signals to the display panel 100 based on a second control signal CON2 received from the timing controller 500. In some embodiments, the data driver may include a gamma corrector (or a gamma voltage generator) to convert the age compensation data ACDATA into voltage corresponding to the data signals. The age compensation data ACDATA in a grayscale domain may be converted into a data voltage in a voltage domain by the gamma corrector. In some embodiments, the gamma corrector may receive the scaled input grayscale data from the grayscale scaler and convert the scaled input grayscale date into a grayscale voltage in the voltage domain. The compensator may add the grayscale voltage and the grayscale compensation value to make a compensated grayscale voltage and provide the compensated grayscale voltage to the display panel 100.

The timing controller 500 may receive input image data IDATA from an external graphic source and control the scan driver 300 and the data driver 400. The timing controller 500 may generate the first and second control signals CON1 and CON2, and may provide the first and second control signals CON1 and CON2 to the scan driver 300 and the data driver 400, respectively. In some embodiments, the input image data IDATA may include input grayscale data, and the timing controller 500 may further control the image sticking compensator 200.

Figure 2:
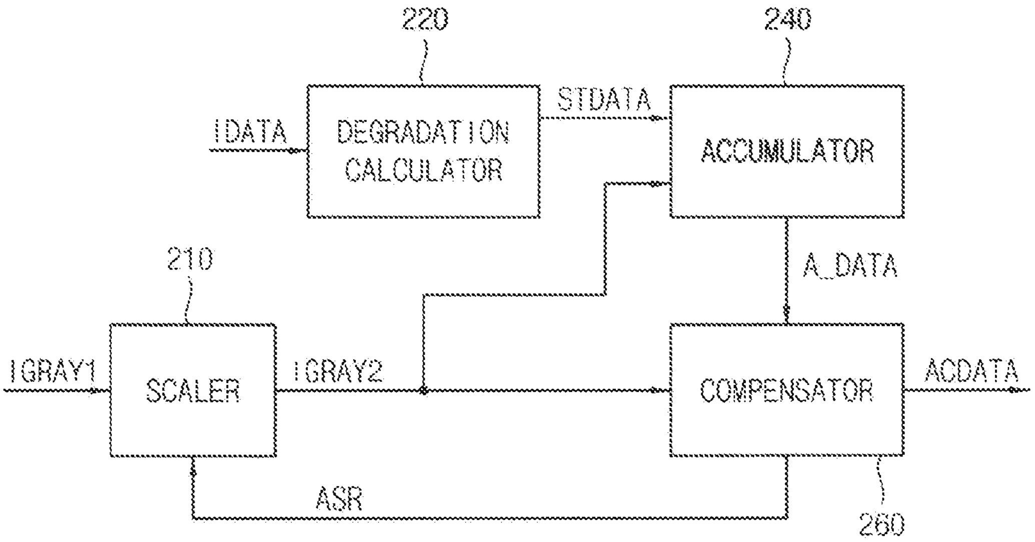
FIG. 2 is a block diagram of an image sticking compensating device according to example embodiments.
Figure 3:
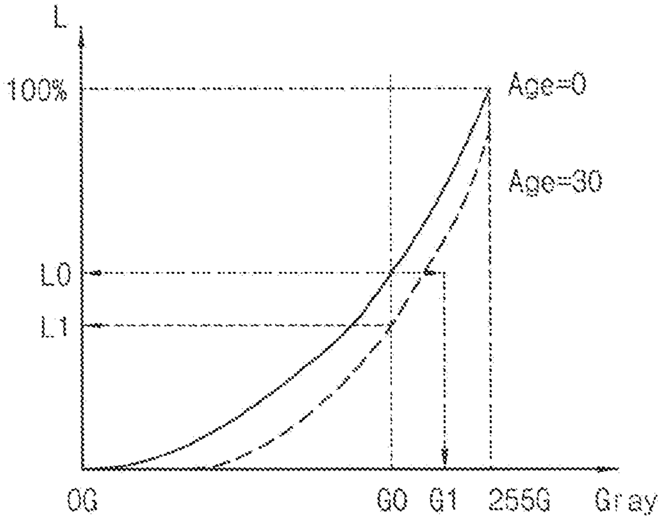
FIG. 3 is a graph illustrating an example in which the image sticking compensating device performs image sticking compensation.
Figure 4:
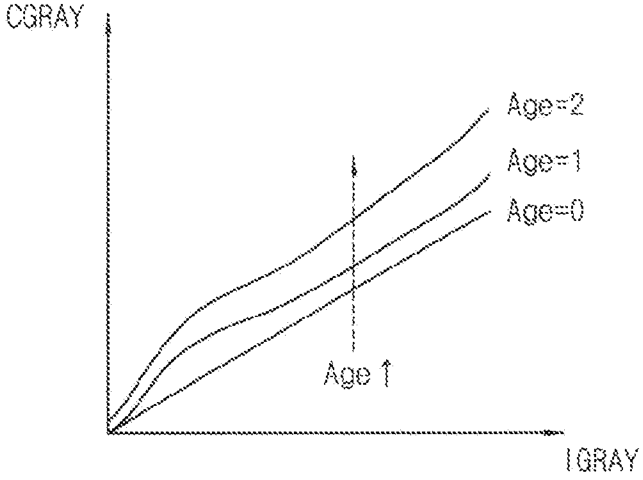
FIG. 4 is a graph illustrating an example of a relationship between an input grayscale and an output grayscale according to an accumulation of degradation information.

FIG. 2 is a block diagram of an image sticking compensating device according to example embodiments. FIG. 3 is a graph illustrating an example in which the image sticking compensating device performs image sticking compensation. FIG. 4 is a graph illustrating an example of a relationship between an input grayscale and an output grayscale according to an accumulation of degradation information.

Referring to FIGS. 2 through 4, the image sticking compensating device 200 (i.e., the image sticking compensator) may include a grayscale scaler 210, a degradation calculator 220, an accumulator 240, and a compensator 260. The image sticking compensating device 200 may compensate image data (i.e., input grayscale data) to prevent image sticking according to accumulated degradation.

FIG. 3 shows a relationship between grayscale levels and luminance values according to the accumulated degradation (or accumulated age) information. As illustrated in FIG. 3, in an initial state (i.e., Age=0), a pixel may emit light having a first luminance level L0 corresponding to a first grayscale level G0 when an input grayscale IGRAY1 corresponding to the first grayscale level G0 is input. As the pixel is gradually degraded (e.g., the graph moves from Age=0 to Age=30), the luminance level corresponding to the input grayscale IGRAY1 of the first grayscale level G0 may decrease to a second luminance level L1. Thus, the image sticking compensating device 200 may compensate the input grayscale IGRAY1 to correspond to about the second grayscale level G1 to emit light having the first luminance level L0.

The degradation calculator 220 may calculate a degradation weight based on input image data IDATA and calculate degradation data STDATA of a frame (e.g., a present frame). The degradation calculator 220 may calculate the degradation weight based on display panel conditions. In some embodiments, the degradation weight may be calculated based on at least one of a location, an input grayscale level, an emission duty, and an emission frequency of a corresponding pixel, and a current temperature of the display panel. The degradation calculator 220 may provide the degradation data STDATA of the present frame (or a previous frame) to which the degradation weight is applied to the accumulator 240.

The accumulator 240 may accumulate the degradation data STDATA and generate age data A_DATA using the accumulated degradation data STDATA. The age data A_DATA may include age information (i.e., degradation information) of each of the pixels. For example, the age information may be represented by 10-bit digital data. For example, the age information may have one of a plurality of age values represented by 10-bit digital data. As illustrated in FIG. 4, the degradation may increase according to an increase of the accumulated amount of the degradation data STDATA, such that a counted value of the age data A_DATA may increase (for example, increase gradually from Age=0 to Age=2 in FIG. 4). Thus, as the pixel is more graded, a compensated grayscale value CGRAY for outputting a specific input grayscale IGRAY is increased. The accumulator 240 may accumulate the degradation data STDATA and scaled input grayscale IGRAY2 at every frame to update the age data A_DATA. In other words, the compensated grayscale value CGRAY of a pixel may correspond to a compensated grayscale level for representing (displaying) a specific input grayscale IGRAY at a specific age corresponding to the age data A_DATA of the pixel. The accumulator 240 may provide the age data A_DATA to the compensator 260.

In some embodiments, the accumulator 240 may generate the age data A_DATA by accumulating the degradation data STDATA and a grayscale of the age compensation data ACDATA.

The compensator 260 may determine a grayscale compensation value corresponding to the age data A_DATA and an input grayscale IGRAY1 (which may be scaled) of the input image data IDATA. The compensator 260 may output the age compensation data ACDATA by applying the grayscale compensation value to the input grayscale IGRAY1 or the scaled input grayscale IGRAY2. In some embodiments, the compensator 260 may not calculate compensation values with respect to all pixels in a lump. Instead, the compensator 260 may individually calculate the grayscale compensation values for every pixel and every grayscale based on the age data A_DATA of each pixel. The compensator 260 may calculate the grayscale compensation value using a lookup table method or a function operating method.

Since the emission efficiency and amount of degradation for each grayscale level are different, it is desirable to apply different grayscale compensation values according to a grayscale level. The compensator 260 may determine an optimum grayscale compensation value in consideration of the amount of accumulated degradation and a grayscale level to be displayed at the present frame. Constructions and operations of the compensator will be described in detail with reference to FIGS. 5 through 11.

The grayscale scaler 210 may generate the scaled input grayscale IGRAY2 based on a scaling ratio ASR corresponding to the age data A_DATA. That is, the input grayscale IGRAY1 is scaled to be the scaled input grayscale IGRAY2. The image sticking compensating device 200 may compensate the input grayscale IGRAY1 to a compensated value greater than the input grayscale IGRAY1 according to the accumulation of the degradation data STDATA to display a proper grayscale level. However, the grayscale compensation value has a limited value in a display device. For example, in a high-grayscale range above a specific grayscale level (e.g., about 200 grayscale level), the compensation may not be performed over a particular grayscale level (e.g., a maximum grayscale level) and may be saturated when the degradation data STDATA is accumulated over a predetermined reference value. Thus, the grayscale scaler 210 may perform a down scaling operation to the input grayscale IGRAY1 based on the amount of the accumulated degradation such that the compensator 260 may calculate optimum grayscale compensation values with respect to the all grayscale levels without saturation of the grayscale compensation value. In some embodiments, the grayscale scaler 210 may receive the scaling ratio ASR corresponding to the age data A_DATA from the compensator 260. For example, the compensator 260 may include a lookup table including a plurality of scaling ratios ASR corresponding to the respective age data A_DATA. In some embodiments, the grayscale scaler 210 may provide the scaled input grayscale IGRAY2 to the accumulator 240 and the compensator 260. The accumulator 240 may generate the age compensation data ACDATA based on the scaled input grayscale IGRAY2 and the age data A_DATA.

As described above, the image sticking compensating device 200 according to example embodiments may accumulate the degradation data STDATA with respect to each of the pixels reflecting pixel location, emission information, temperature, or the like, such that an accurate amount of degradation of each pixel may be calculated. In addition, the optimum grayscale compensation value may be determined based on the accumulated age data A_DATA and grayscale, such that accuracy of image sticking compensation may be significantly improved. Further, since individual compensation for all grayscale levels may be performed, image sticking with respect to all the grayscale levels may be not recognized.

Figure 5:
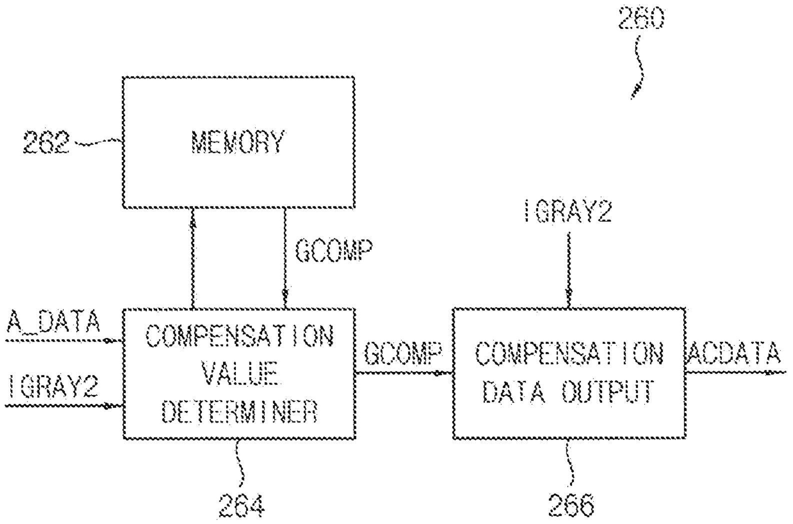
FIG. 5 is a block diagram illustrating an example of a compensator included in the image sticking compensating device of FIG. 2.

FIG. 5 is a block diagram illustrating an example of a compensator included in the image sticking compensating device of FIG. 2.

Referring to FIG. 5, the compensator 260 of the image sticking compensating device 200 may include a memory 262, a compensation value determiner 264, and a compensation data output 266.

In some embodiments, the compensator 260 may determine a grayscale compensation value GCOMP using a lookup table.

The memory 262 may store a plurality of lookup tables each having compensation values respectively corresponding to a plurality of predetermined age values and display grayscales implemented by a display panel. Each of the age values may match a corresponding one of the age data. Each of the lookup tables may have compensation values each corresponding to a predetermined age value with a predetermined grayscale level. In some embodiments, the lookup tables may be classified according to pixel colors and predetermined temperatures of a display panel. The memory 262 may include a static random access memory (SRAM) or a dynamic random access memory (DRAM) to store the lookup tables.

The compensation value determiner 264 may determine the grayscale compensation value GCOMP corresponding to the age data A_DATA and the scaled input grayscale IGRAY2 through the lookup tables. In some embodiments, the compensation value determiner selects one of the lookup tables based on a current temperature of the display panel and a pixel color. The compensation value determiner 264 may determine the grayscale compensation value GCOMP corresponding to the age data A_DATA and the scaled input grayscale IGRAY2 through the selected lookup table. Thus, emission color, a degree of degradation (age), and a temperature of the pixel, and a grayscale level to be output from the pixel maybe reflect to the grayscale compensation value GCOMP.

The compensation data output 266 may output the age compensation data ACDATA by applying the grayscale compensation value GCOMP to the scaled input grayscale data IGRAY2. Here, the age compensation data ACDATA may be a digital type defined as a grayscale domain. The age compensation data ACDATA may be converted into an analog type voltage defined as a voltage domain by a gamma corrector, which may be separately equipped. The converted age compensation data may be provided to the display panel.

As described above, the image sticking compensating device 200 may include the compensator 260 to calculate the optimized grayscale compensation value GCOMP according to the accumulated age data A_DATA and the grayscale, such that accuracy of image sticking compensation may be significantly improved and individual compensation for all grayscale levels may be performed. Thus, image sticking with respect to all the grayscale levels may be not recognized. In addition, since the grayscale compensation values GCOMP are set in the plurality of lookup tables, the compensation logic may be simplified, and the logic design may be easy.

Figure 6:
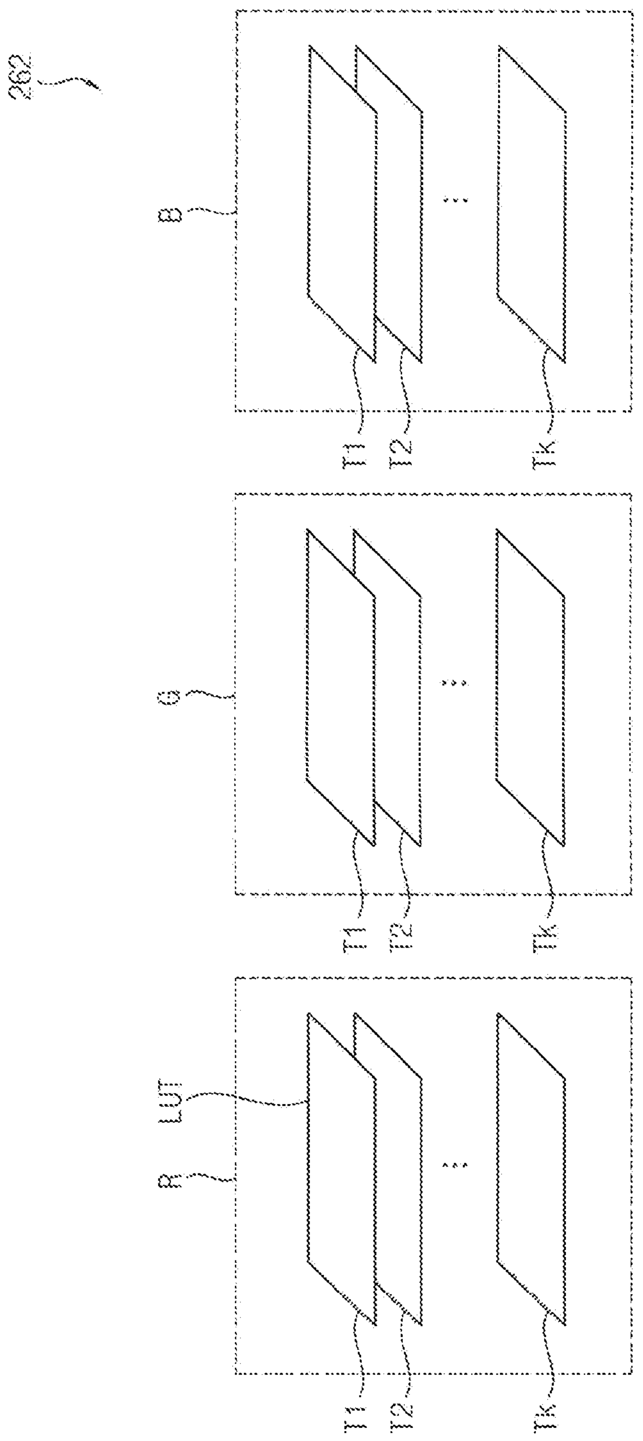
FIG. 6 is a block diagram illustrating an example of a memory included in the compensator of FIG. 5.
Figure 8A:
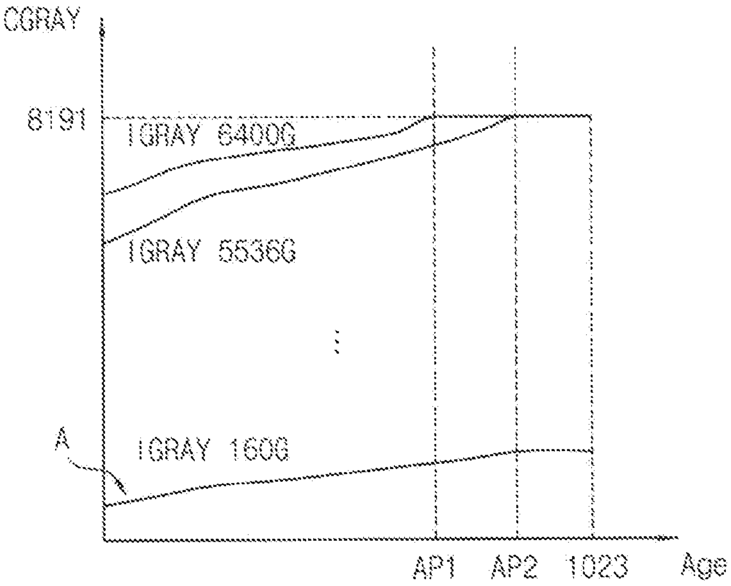
FIGS. 8A and 8B are graphs illustrating examples of an age compensation data set in the lookup table of FIG. 7.
Figure 8B:
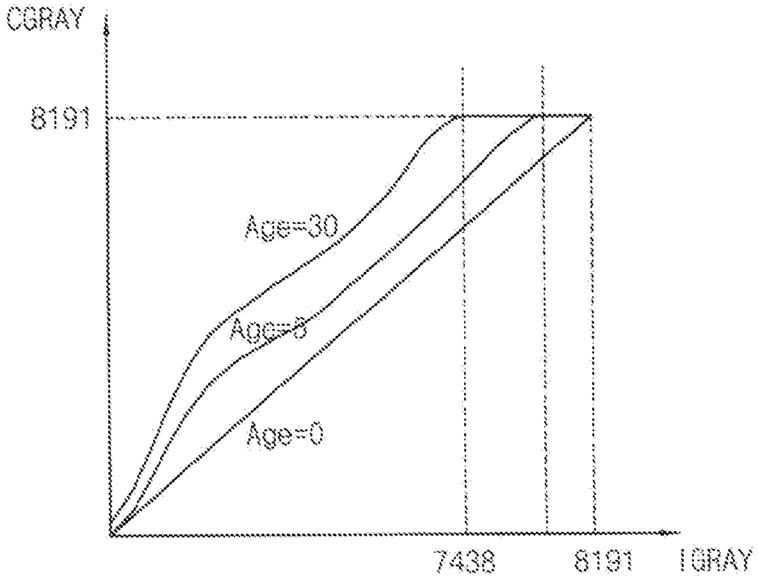

FIG. 6 is a block diagram illustrating an example of a memory included in the compensator of FIG. 5. FIG. 7 is a block diagram illustrating an example of a lookup table included in the memory of FIG. 5. FIGS. 8A and 8B are graphs illustrating examples of age compensation data set in the lookup table of FIG. 7.

Referring to FIGS. 6 through 8B, the compensator 260 may determine the grayscale compensation value GCOMP using lookup tables.

In some embodiments, as illustrated in FIG. 6, the memory 262 may include a plurality of lookup tables LUT. The lookup tables LUT may be set according to emission colors of pixels and temperatures of the display panel. For example, the emission colors (or pixel colors) may include red, green and blue colors. The lookup tables LUT may be divided into a first table group R applied to red pixels, a second table group G applied to green pixels, and a third table group B applied to blue pixels. In addition, each of the first to third tables R, G, and B may include a plurality of lookup tables LUT corresponding to respective predetermined temperatures. For example, each of the first to third tables R, G, and B may include first through k-th lookup tables LUT corresponding to respective first through k-th temperatures T1 through Tk, where k is an integer greater than 1. Each of the first through k-th temperatures T1 through Tk may include a specific temperature range or value. In some embodiments, the grayscale compensation value GCOMP with respect to a specific temperature may be calculated by an interpolation between the lookup tables.

As illustrated in FIG. 7, a plurality of compensation values (grayscale compensation values) corresponding to a plurality of predetermined age values AGE and the display grayscales GRAY may be set in the lookup table LUT corresponding to the first temperature T1 and the red pixel. In FIG. 7, the display grayscales may be divided into 256 levels (i.e., 8-bit levels) and the display grayscales may be compensated to be 13-bit compensation values (e.g., compensated grayscales). In addition, the age values AGE may be divided into 1024 levels (i.e., 10-bit levels) according to the amount of degradation. The age data A_DATA received by the compensator 260 may be correspond to one of the age values AGE. Since these are examples, bit sizes (data sizes) of the display grayscale, the compensation value, and age value are not limited thereto.

In some embodiments, the lookup table LUT may include scaling ratios ASR each corresponding to the age value AGE. In some embodiments, the compensator 260 may provide a scaling ratio ASR corresponding to the age data A_DATA to the grayscale scaler 210. The grayscale scaler 210 may scale the input grayscale IGRAY1 using the scaling ratio ASR to generate the scaled input grayscale IGRAY2. As illustrated in FIG. 7, when the age value AGE increases, the compensation values may be saturated to 8191. To prevent the compensation value saturation, the input grayscale IGRAY1 may be down-scaled using the scaling ratio ASR according to the age value AGE.

FIG. 8A shows a relationship between the degradation accumulation (i.e., the age data) and the grayscale compensation value CGRAY of the age compensation data. That is, as the amount of accumulated degradation (or, the age value AGE) increases, the grayscale compensation value CGRAY of the age compensation data may increase. For example, as the amount of accumulated degradation increases, the grayscale compensation value CGRAY may increase to display an image corresponding to an input grayscale IGRAY of a 160 grayscale level 160G (illustrated as 'A' in FIGS. 7 and 8A). However, for the input grayscale IGRAY of a 6400 grayscale level 6400G, a maximum compensation value (i.e., 8191) is applied to the input image data that is within from a first age value AP1 to maximum age value (represented as '1023' in FIG. 8A), such that the grayscale compensation value CGRAY may be saturated from the first age value AP1. Thus, the compensation with respect to the age data greater than the first age value AP1 may be not accurate, and the display grayscale and luminance with respect to the input grayscale IGRAY of 6400 grayscale level 6400G may be decreased. As illustrated in FIG. 8A, the grayscale compensation value CGRAY corresponding to the input grayscale IGRAY of the 6400 grayscale level 6400G may be substantially the same as the grayscale compensation value CGRAY corresponding to the input grayscale IGARY of a 5536 grayscale level 5536G, when the age data greater than or equal to a second age value AP2.

The grayscale scaler 210 may be applied to the image sticking compensating device 200 to solve this problem. The grayscale scaler 210 may apply the scaling ration ASR corresponding to the age value AGE to the input image data to downscale the input grayscale IGRAY. Thus, a saturation region within from first age value AP1 to maximum age value of the age value AGE of FIG. 8A may change to be unsaturated, such that accurate image sticking compensation may be performed. For example, when the age value corresponding to the age data A_DATA is 5 (i.e., Age=5), the input grayscale may be multiplied by a scaling ratio 0.982 as illustrated in FIG. 7.

FIG. 8B shows a relationship between the input grayscale IGRAY of the input image data and the grayscale compensation value CGRAY of the age compensation data. The grayscale compensation value CGRAY of the age compensation data may be saturated with respect to the input grayscale IGRAY from about 7438 grayscale level when the age value is 30 (represented as 'Age=30'). Here, the grayscale scaler 210 may apply the scaling ratio ASR corresponding to the age value to the input grayscale IGRAY so as to change the saturation region within from 7438 grayscale level to 8191 grayscale level of the input grayscale IGRAY of FIG. 8B to be unsaturated. Thus, accurate image sticking compensation may be performed with respect to all of the grayscale levels.

As described above, the image sticking compensating device 200 may include the grayscale scaler 210 and the compensator 260 to calculate the optimized grayscale compensation value GCOMP according to the accumulated age data A_DATA and the input grayscale IGRAY1, such that accuracy of image sticking compensation may be significantly improved and individual compensation for all of the grayscale levels may be performed. Thus, image sticking with respect to all the grayscale levels may be not recognized. In addition, since the grayscale compensation values GCOMP are set in the plurality of lookup tables, the compensation logic may be simplified, and the logic design may be easy.

Figures 9, 10:
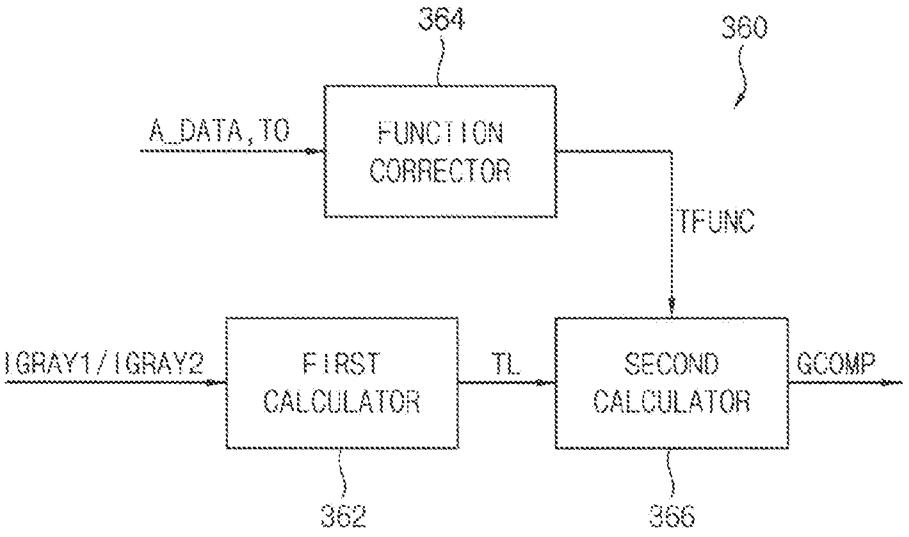
FIG. 9 is a diagram for explaining an example in which the compensator of FIG. 5 further applies a weight to the age data.
FIG. 10 is a block diagram illustrating another example of a compensator included in the image sticking compensating device of FIG. 2.

FIG. 9 is a diagram for explaining an example in which the compensator of FIG. 5 further applies a weight to age data.

Referring to FIG. 9, the compensator 260 may divide the display panel 100 into a plurality of blocks and determine block weights with respect to the respective blocks.

For example, as illustrated in FIG. 9, the display panel may be divided into k*j blocks, and some block weights may be determined respectively at the blocks, where k and j are integers greater than 1.

The compensator 260 may further apply the block weight to the age data A_DATA. The compensator 260 may determine the grayscale compensation value GCOMP based on the age data A_DATA to which the block weight is applied. For example, the compensator 260 may determine the grayscale compensation value GCOMP based on an age value corresponding to the age data A_DATA to which the block weight is applied and an input grayscale.

Figure 11:
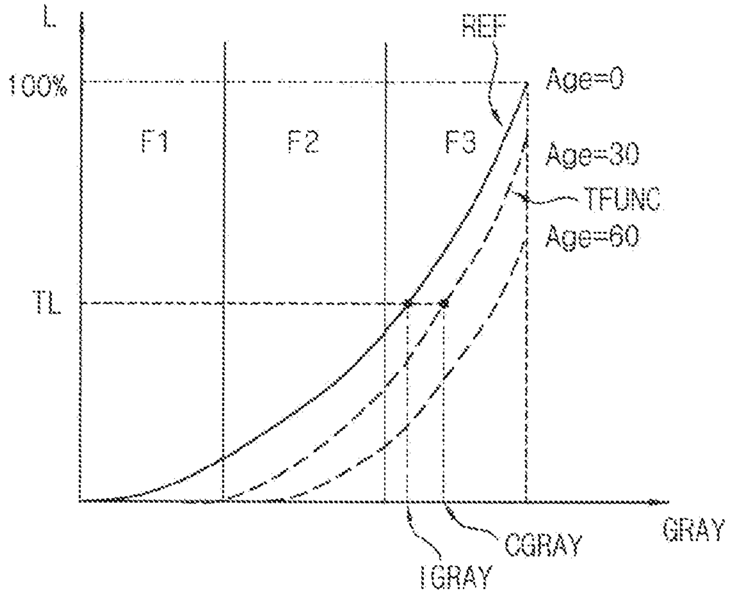
FIG. 11 is a graph for explaining an example of an operation of the compensator of FIG. 10.

FIG. 10 is a block diagram illustrating another example of a compensator included in the image sticking compensating device of FIG. 2. FIG. 11 is a graph for explaining an example of an operation of the compensator of FIG. 10.

Referring to FIGS. 2, 10, and 11, the compensator 360 may include a first calculator 362, a function corrector 364, and a second calculator 366.

The compensator 360 may output the age compensation data using functions rather than lookup tables.

The first calculator 362 may calculate a target luminance TL corresponding to an input grayscale IGRAY1 or a scaled input grayscale IGRAY2 using a predetermined reference grayscale-luminance function REF. In some embodiments, as illustrated in FIG. 11, the reference grayscale-luminance function REF may correspond to a grayscale-luminance relationship in an initial state (i.e., a graph of Age=0 in FIG. 11). The grayscale-luminance function may be a formulation of the relationship between the input grayscale data and output luminance corresponding to the input grayscale data.

The function corrector 364 may correct the reference grayscale-luminance function REF to a target function TFUNC for corresponding to the age data A_DATA and a current temperature of a display panel. In some embodiments, as illustrated in FIG. 11, the reference grayscale-luminance function REF may be adjusted as the target function TFUNC when the age data A_DATA corresponds to the age value Age=30. Thus, the input grayscale IGRAY1 or the scaled input grayscale IGRAY2 may change to the grayscale compensation value CGRAY to emit light having the target luminance TL.

In some embodiments, the grayscales may be divided into a plurality of grayscale sections. Here, the reference grayscale-luminance function REF and the target function TFUNC may include a plurality of different auxiliary functions F1, F2, and F3 each defined in a plurality of predetermined grayscale sections. In some embodiments, the auxiliary functions F1, F2, and F3 may be continuous. For example, the reference grayscale-luminance function REF and/or the target function TFUNC may correspond to combinations of quadratic functions and/or cubic functions.

The second calculator 366 may calculate the grayscale compensation value CGRAY corresponding to the target luminance TL by calculating an inverse function of the target function. Accordingly, the grayscale compensation value CGRAY corresponding to the input grayscale IGRAY1/IGRAY2 may be relatively easily calculated by using simple logic to calculate the inverse function of the target function TFUNC.

As described above, the image sticking compensating device 200 may include the compensator 360 to calculate the optimized grayscale compensation value GCOMP according to the accumulated age data A_DATA and the grayscale, such that accuracy of image sticking compensation may be significantly improved and individual compensation for all grayscale levels may be performed. Thus, image sticking with respect to all the grayscale levels may be not recognized. In addition, since the grayscale compensation values GCOMP are calculated by using functions, the memory size for compensating the image sticking may be reduced, and manufacturing costs may be reduced.

Figure 12:
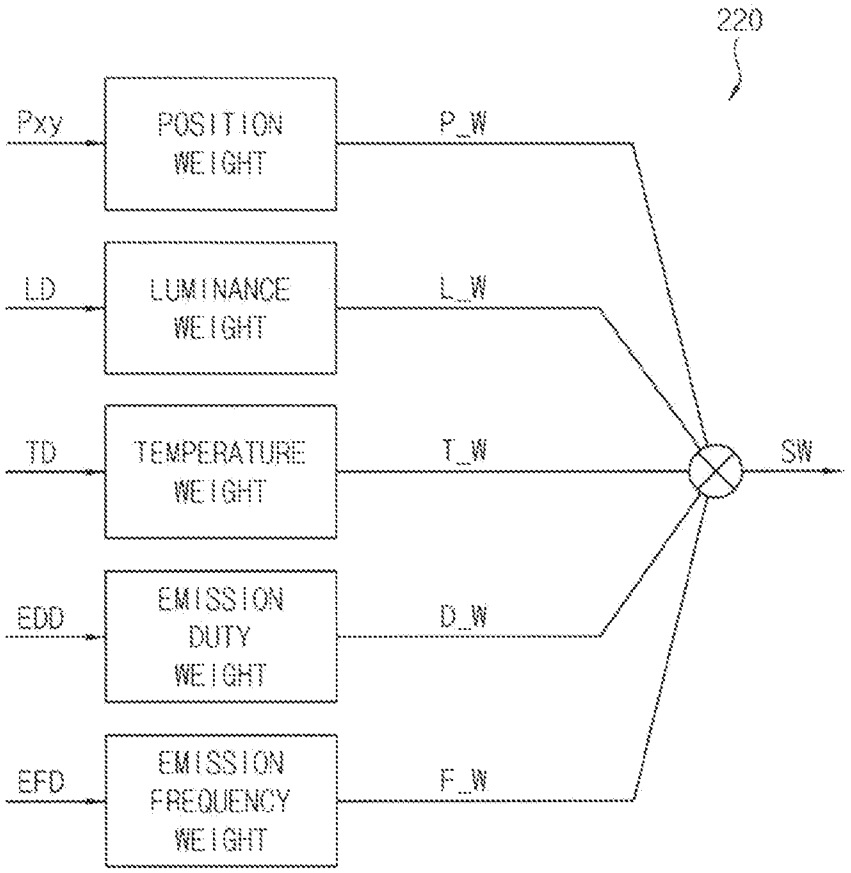
FIG. 12 is a diagram illustrating an example of a degradation calculator included in the image sticking compensating device of FIG. 2.

FIG. 12 is a diagram illustrating an example of a degradation calculator included in the image sticking compensating device of FIG. 2.

Referring to FIG. 12, the degradation calculator 220 may calculate a degradation weight SW based on input image data.

The input image data may include a location Pxy of a pixel, luminance LD of the pixel, an emission duty EDD of the pixel, an emission frequency EFD of the pixel, and/or the like. Further, the degradation calculator 220 may further receive temperature data of the display panel having current temperature TD information, which is detected by a temperature sensor. The degradation calculator 220 may calculate at least one of a location weight P_W calculated based on a location Pxy of the pixel, a luminance weight L_W corresponding to luminance LD of the pixel, a temperature weight T_W corresponding to the current temperature TD of the display panel, an emission duty weight D_W corresponding to the emission duty EDD, and an emission frequency weight F_W corresponding to the emission frequency EFD.

The degradation calculator 220 may calculate degradation data of a frame based on the degradation weight SW.

Figure 13:
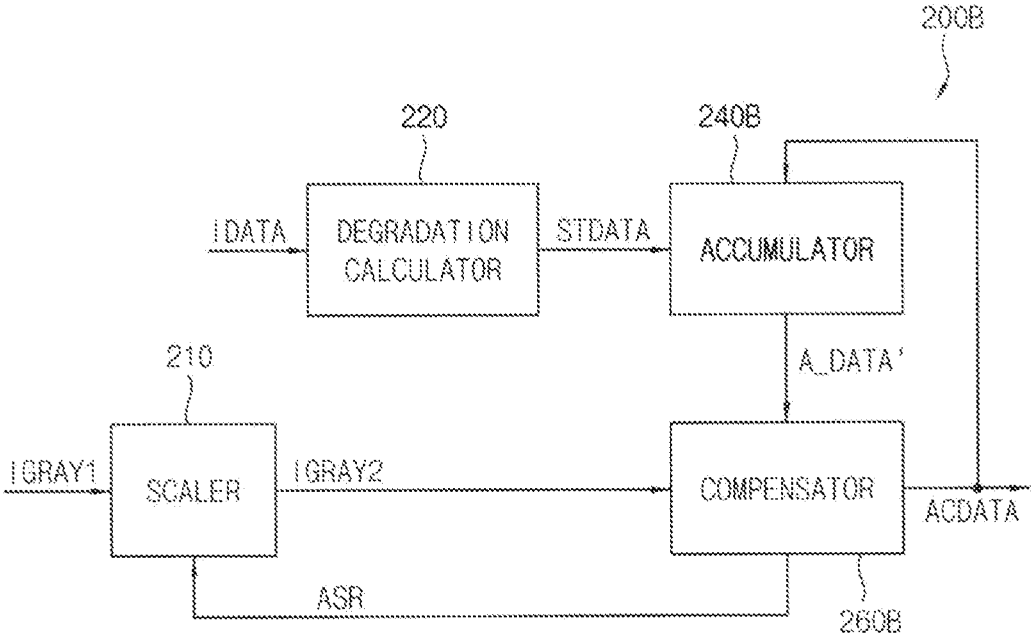
FIG. 13 is a block diagram illustrating an example of an operation of the image sticking compensating device of FIG. 2.

FIG. 13 is a block diagram illustrating an example of an operation of the image sticking compensating device of FIG. 2.

The image sticking compensating device of the present example embodiments are substantially the same as the image sticking compensating device explained with reference to FIG. 2 except for operations in which age compensation data are provided to the accumulator. Thus, the same reference numerals will be used to refer to the same or like parts as those described in the example embodiments of FIG. 2, and any repetitive explanation concerning the above elements will be omitted.

Referring to FIGS. 2 and 13, the image sticking compensating device 200B may include a grayscale scaler 210, a degradation calculator 220, an accumulator 240B, and a compensator 260B. The compensator 260B of the image sticking compensating device 200B may provide age compensation data ACDATA or grayscale compensation value of the age compensation data ACDATA to the accumulator 240B.

The accumulator 240B may accumulate the degradation data STDATA and the age compensation data ACDATA together and generate the age data A_DATA'. Accordingly, the accumulator 240B may consistently accumulate the age data A_DATA' reflecting the age compensation. Thus, the compensator 260 may output the grayscale compensation value and the age compensation data ACDATA based on the age data A_DATA'.

Figure 14:
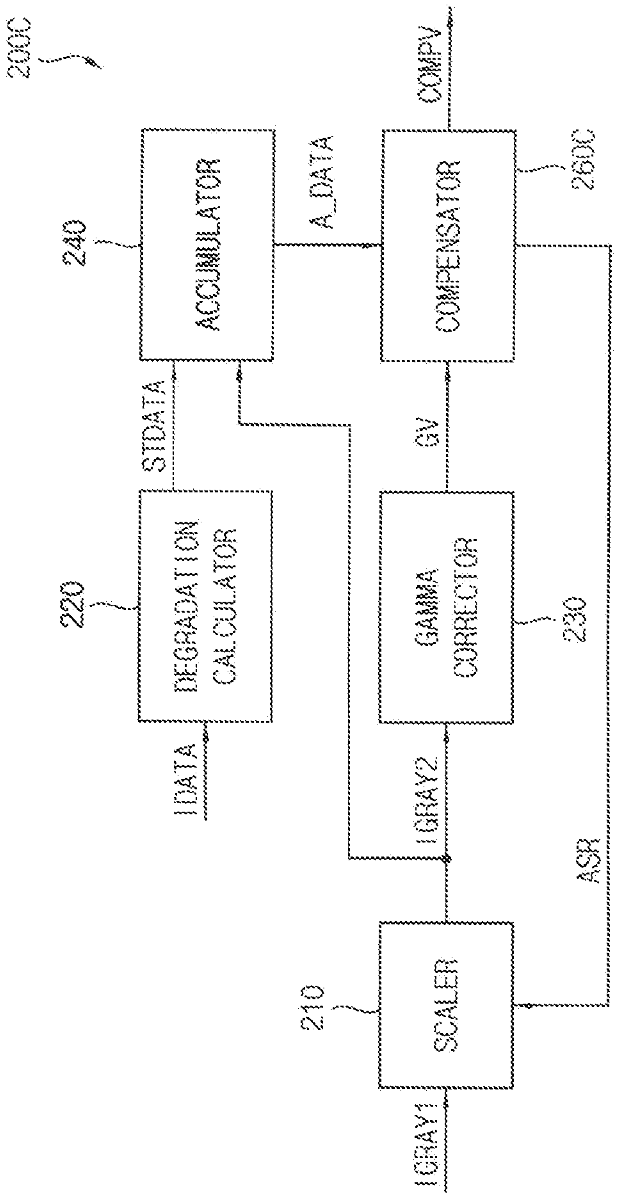
FIG. 14 is a block diagram illustrating an example of the image sticking compensating device of FIG. 2.

FIG. 14 is a block diagram illustrating an example of the image sticking compensating device of FIG. 2.

The image sticking compensating device of the present example embodiments are substantially the same as the image sticking compensating device explained with reference to FIG. 2 except for constructions of the gamma corrector. Thus, the same reference numerals will be used to refer to the same or like parts as those described in the example embodiments of FIG. 2, and any repetitive explanation concerning the above elements will be omitted.

Referring to FIG. 14, the image sticking compensating device 200C may include a grayscale scaler 210, a degradation calculator 220, a gamma corrector 230, an accumulator 240, and a compensator 260C.

The grayscale scaler 210 may downscale the input grayscale IGRAY1 based on the scaling ratio ASR corresponding to each of a plurality of predetermined age values. The grayscale scaler 210 may provide the scaled input grayscale IGRAY2 to the accumulator 240 and the gamma corrector 230.

The degradation calculator 220 may calculate the degradation weight SW and the degradation data STDATA of a frame (e.g., a present frame) based on the input image data IDATA.

The accumulator 240 may accumulate the degradation data STDATA and the scaled input grayscale IGRAY2 (or the input grayscale IGRAY1) to generate the age data A_DATA. The degradation data STDATA are accumulated to be the age data A_DATA. For example, the age data A_DATA may be accumulated degradation data STDATA up to the present frame.

The gamma corrector 230 may convert the scaled input grayscale IGRAY2 (or the input grayscale IGRAY1) into a gamma voltage GV or an analog type. The scaled input grayscale IGRAY2 may be a digital type defined by a grayscale domain, and the gamma voltage GV may be the analog type defined by a voltage domain for being applied to the display panel.

The compensator 260C may determine the grayscale compensation value GCOMP based on the age data A_DATA and the gamma voltage GV and output a grayscale compensation voltage COMPV in the analog type corresponding to age compensation data. The grayscale compensation voltage COMPV may be provided to a data driver of the display device.

Accordingly, the image sticking compensating device 200C may include the gamma corrector 230 for converting the scaled input grayscale IGRAY2 (input image data) of the grayscale domain into the gamma voltage GV of the voltage domain such that the grayscale compensation voltage COMPV of the analog type may be directly provided to the data driver. Thus, the compensator 260C and the image sticking compensating device 200C including the same may be applied to various display devices regardless of the types of pixel circuit and the types of panel driving method.

As described above, the image sticking compensating device 200C may calculate the optimized grayscale compensation voltage COMPV according to the accumulated age data A_DATA and the input grayscale IGRAY1, such that accuracy of image sticking compensation may be significantly improved and individual compensation for all of the grayscale levels may be performed. Thus, image sticking with respect to all the grayscale levels may be not recognized.

The present embodiments may be applied to any display device driven by the image sticking compensating methods. For example, the present embodiments may be applied to a flat display device, a flexible display device, a curved display device, a transparent display device, a mirror display device, etc, and applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. An image sticking compensating circuit comprising:

a first circuit portion configured to generate age data by accumulating degradation data of each frame corresponding an image displayed on a display panel;

a second circuit portion configured to generate a scaled input grayscale of input image data by multiplying an input grayscale of the input image data by a scaling ratio that is determined by age value corresponding to the age data to downscale the input grayscale of the input image data; and a third circuit portion configured to generate age compensation data, which is a compensated version of the input image data, by applying a grayscale compensation value that is determined by the age data and the scaled input grayscale of the input image data to the scaled input grayscale of the input image data.

2. The circuit of claim 1, wherein the image is displayed on the display panel based on the age compensation data.

3. The circuit of claim 1, wherein luminance of each pixel of the display panel decreases as the scaling ratio decreases.

4. The circuit of claim 3, wherein a luminance decreasing ratio is substantially constant regardless of the age data.

5. The circuit of claim 3, wherein a luminance decreasing ratio is substantially constant regardless of pixel colors.

6. The circuit of claim 1, further comprising:

a memory including a plurality of lookup tables each having compensation values respectively corresponding to a plurality of predetermined age values and display grayscales implemented by the display panel, each of the age values matching a corresponding one of the age data.

7. The circuit of claim 6, wherein the grayscale compensation value is determined based on the lookup tables.

8. The circuit of claim 7, wherein the lookup tables are set based on pixel colors in the display panel and predetermined temperatures of the display panel, respectively.

9. The circuit of claim 8, wherein one of the lookup tables is selected based on a current temperature of the display panel and a pixel color.

10. The circuit of claim 1, wherein the third circuit portion calculates a target luminance corresponding to the scaled input grayscale of the input image data using a predetermined reference grayscale-luminance function, corrects the reference grayscale-luminance function to a target function for corresponding to the age data and a current temperature of the display panel, and calculates the grayscale compensation value corresponding to the target luminance by calculating an inverse function of the target function.

11. The circuit of claim 10, wherein the target function includes a plurality of different auxiliary functions each defined in a plurality of predetermined grayscale sections.

12. The circuit of claim 11, wherein the auxiliary functions are continuous with each other.

13. The circuit of claim 1, wherein the third circuit portion divides the display panel into a plurality of blocks, determines each block weight corresponding to each of the blocks, applies the block weight to the age data, and determines the grayscale compensation value based on the age data to which the block weight is applied and the scaled input grayscale of the input image data.

14. The circuit of claim 1, wherein the first circuit portion calculates a degradation weight based on the input image data.

15. The circuit of claim 14, wherein the degradation weight includes at least one of a location weight calculated based on a location of a pixel corresponding to the input image data, a luminance weight calculated based on the input grayscale of the input image data, and a temperature weight calculated based on a current temperature of the display panel.

16. The circuit of claim 14, wherein the degradation weight further includes an emission duty weight calculated based on an emission duty corresponding to the input image data and an emission frequency weight calculated based on an emission frequency corresponding to the input image data.

17. The circuit of claim 1, further comprising:

a fourth circuit portion configured to convert the scaled input grayscale of the input image data into a gamma voltage represented in a voltage domain.

18. The circuit of claim 17, wherein the third circuit portion converts the age compensation data into a grayscale voltage in the voltage domain based on the gamma voltage and the age data.

* * * * *